US009673438B2

(12) United States Patent
Jeong et al.

(10) Patent No.: US 9,673,438 B2
(45) Date of Patent: Jun. 6, 2017

(54) BATTERY MODULE AND METHOD OF MANUFACTURING THE SAME

(71) Applicant: Samsung SDI Co., Ltd., Yongin-si, Gyeonggi-do (KR)

(72) Inventors: Ik-Jae Jeong, Yongin-si (KR); Mincheol Bae, Yongin-si (KR); Jiho Lee, Yongin-si (KR); Hongkeun Choi, Yongin-si (KR); Kyounghwan Noh, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 261 days.

(21) Appl. No.: 14/459,103

(22) Filed: Aug. 13, 2014

(65) Prior Publication Data
US 2015/0228957 A1 Aug. 13, 2015

(30) Foreign Application Priority Data

Feb. 7, 2014 (KR) .................. 10-2014-0014186

(51) Int. Cl.
*H01M 2/20* (2006.01)
*H01M 2/30* (2006.01)
(Continued)

(52) U.S. Cl.
CPC ............. *H01M 2/206* (2013.01); *B23K 26/20* (2013.01); *B23K 31/02* (2013.01); *H01M 2/30* (2013.01);
(Continued)

(58) Field of Classification Search
CPC .... B23K 26/20; B23K 31/02; B23K 2201/38; H01M 2220/20; H01M 2/206; H01M 2/30
See application file for complete search history.

(56) References Cited

U.S. PATENT DOCUMENTS

| 2012/0055909 | A1* | 3/2012 | Miyake | B21K 25/00 |
| | | | | 219/121.64 |
| 2013/0269978 | A1* | 10/2013 | You | H01B 1/02 |
| | | | | 174/126.1 |
| 2013/0344378 | A1* | 12/2013 | Kohara | H01M 2/1016 |
| | | | | 429/158 |

FOREIGN PATENT DOCUMENTS

| KR | 10-2012-0051163 A | 5/2012 |
| KR | 10-2013-0041232 A | 4/2013 |
| KR | 10-2013-0047506 A | 5/2013 |

OTHER PUBLICATIONS

EPO Search Report dated Jan. 5, 2015, for corresponding European Patent application 14178826.5, (11 pages).

* cited by examiner

*Primary Examiner* — Brittany Raymond
(74) *Attorney, Agent, or Firm* — Lewis Roca Rothgerber Christie LLP

(57) ABSTRACT

A battery module according to aspects of the present invention includes a plurality of battery cells each having a terminal, a reflective portion on the terminal, and a bus-bar coupled to the terminal to electrically connect the plurality of battery cells. The bus-bar may have an opening exposing at least a portion of the reflective portion. The reflective portion may be configured to reflect laser incident thereon through the opening. A method of manufacturing the battery module may include placing a bus-bar electrically connecting terminals of a plurality of battery cells, each of the terminals having a reflective portion on a top surface thereof, and the bus-bar having an opening exposing at least a portion of the reflective portion, and welding the bus-bar and the terminal to each other. The task of welding the bus bar may include irradiating a laser through the opening in the bus-bar.

17 Claims, 6 Drawing Sheets

(51) Int. Cl.
  B23K 31/02 (2006.01)
  B23K 26/20 (2014.01)
  B23K 101/38 (2006.01)
(52) U.S. Cl.
  CPC ..... *B23K 2201/38* (2013.01); *H01M 2220/20* (2013.01)

(a)

(b)

(c)

BATTERY MODULE AND METHOD OF MANUFACTURING THE SAME

CROSS-REFERENCE TO RELATED APPLICATION

This application claims priority to and the benefit of Korean Patent Application No. 10-2014-0014186, filed on Feb. 7, 2014, in the Korean Intellectual Property Office, the entire disclosure of which is incorporated herein by reference.

BACKGROUND

1. Field

An aspect of the present invention relates to a battery module and a method of manufacturing the same.

2. Description of the Related Art

A high-power battery module using a non-aqueous electrolyte with high energy density has recently been developed. The high-power battery module is configured as a high-voltage or large-capacity battery module assembled by connecting a plurality of battery cells in parallel or series for use in driving motors of devices requiring high power, e.g., electric vehicles, etc. Further, a battery pack can be assembled by electrically connecting such a plurality of battery modules to one another.

With the increasing number of devices employing the battery modules described above, studies have been centered on improving the productivity of these battery modules. With increased diversity in the external appearance of the devices employing these battery modules, the shapes of these battery modules must also vary. However, the safety of the battery module is also a concern. Therefore, studies on the structure of a battery module capable of satisfying all the requirements including aesthetics and safety have become increasingly critical.

SUMMARY

Aspects of the present invention relate to a battery module and a method of manufacturing the same. Embodiments provide a battery module and a method of manufacturing the same which can improve electrical safety in a battery pack when battery cells are connected, for example, through a bus-bar.

According to an aspect of the present invention, a battery module includes a plurality of battery cells each having a terminal, a reflective portion on the terminal, and a bus-bar coupled to the terminal to electrically connect between the plurality of battery cells, the bus-bar having an opening exposing at least a portion of the reflective portion.

The reflective portion may be configured to reflect laser incident thereon through the opening.

The reflective portion may be configured to guide at least a portion of the laser reflected by the reflective portion between the bus-bar and the terminal.

At least a portion of the reflective portion may be melted by the laser reflected between the bus-bar and the terminal.

The opening of the bus-bar may have a stepped shape.

The opening of the bus-bar may include a first opening and a second opening adjacent to the terminal and configured to communicate with the first opening, the second opening being larger than that of the first opening.

The reflective portion may be positioned in the second opening.

The reflective portion may contact a portion of the bus-bar adjacent the second opening.

The reflective portion may include a first reflective portion having at least one inclined surface configured to reflect a laser incident thereon through the opening and to guide the laser between the bus-bar and the terminal, and a second reflective portion between the first reflective portion and the terminal, wherein the second reflective portion may contact the portion of the bus bar adjacent the second opening.

An exposed surface of the second reflective portion may have a textured surface.

A size of the opening in the bus-bar may decrease in a direction away from the terminal.

The reflective portion may include at least one inclined surface.

The at least one inclined surface of the reflective portion may be configured to reflect a laser incident thereon through the opening to couple the bus-bar and the terminal to each other.

An inner wall of the bus-bar may have a textured surface.

An exposed surface of the terminal may have a textured surface.

At least a portion of the reflective portion may have a triangular, trapezoidal, or curved-surface shape.

The reflective portion may have a reflectivity of at least 80 percent of a laser applied to the reflective portion.

The reflective portion may have at least one selected from the group consisting of silver, aluminum, copper, and a mirror, wherein the mirror includes a glass layer and a metal layer coated on the glass layer.

According to an aspect of the present invention, a method of manufacturing a battery module includes placing a bus-bar electrically connecting terminals of a plurality of battery cells, each of the terminals having a reflective portion on a top surface thereof, and the bus-bar having an opening exposing at least a portion of the reflective portion, and welding the bus-bar and the terminal to each other.

The welding the bus bar may include irradiating a laser through the opening in the bus-bar.

The laser may be reflected on the reflective portion such that at least a portion of the laser is guided to a point at which the bus-bar and the terminal contact each other.

Other features and advantages of embodiments of the present invention will become more fully apparent from the following detailed description, taken in conjunction with the accompanying drawings.

Terms or words used in this specification and claims should not be restrictively interpreted as ordinary meanings or dictionary-based meanings, but should be interpreted as meanings and concepts conforming to the scope of the disclosure of the present invention on the basis of the principle that an inventor can properly define the concept of a term to describe and explain his or her invention in the best way; or as would be understood by those skilled in the art.

In the embodiments of the battery module and the method of manufacturing the same according to the present invention, the welding portion between the bus-bar and the terminal can be firmly formed without being directly exposed to the outside of the bus-bar, thereby improving electrical safety regarding the connection of the bus-bar.

BRIEF DESCRIPTION OF THE DRAWINGS

Example embodiments will now be described more fully with reference to the accompanying drawings. However, aspects of the present invention may be embodied in different forms and should not be construed as limited to the embodiments set forth herein. Rather, these embodiments are provided for thoroughness and completeness, and should convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
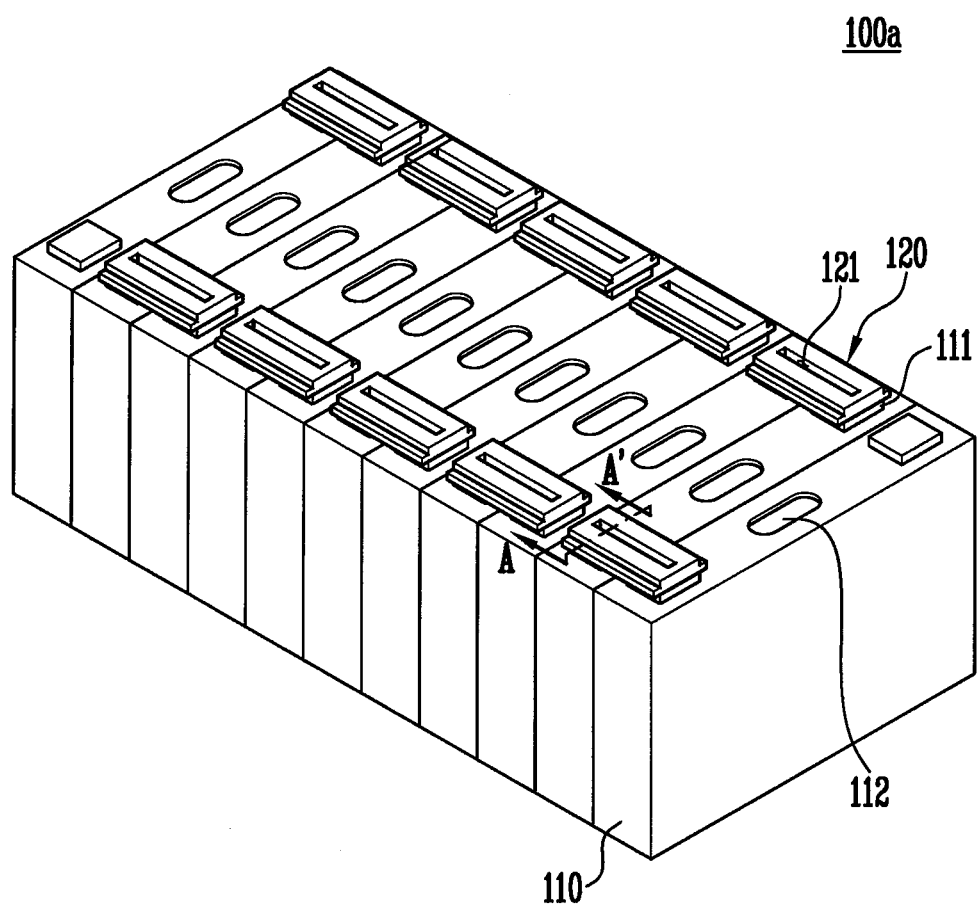
FIG. 1 is a perspective view of a battery module according to an embodiment of the present invention.

In the following detailed description, only certain embodiments of the present invention have been shown and described, simply by way of illustration. As those skilled in the art would appreciate, the described embodiments may be modified in various ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed between. Also, when an element is referred to as being "connected to" another element, it can be directly connected to the another element or be indirectly connected to the another element with one or more intervening elements interposed between. Hereinafter, like reference numerals refer to like elements.

Figure 2:
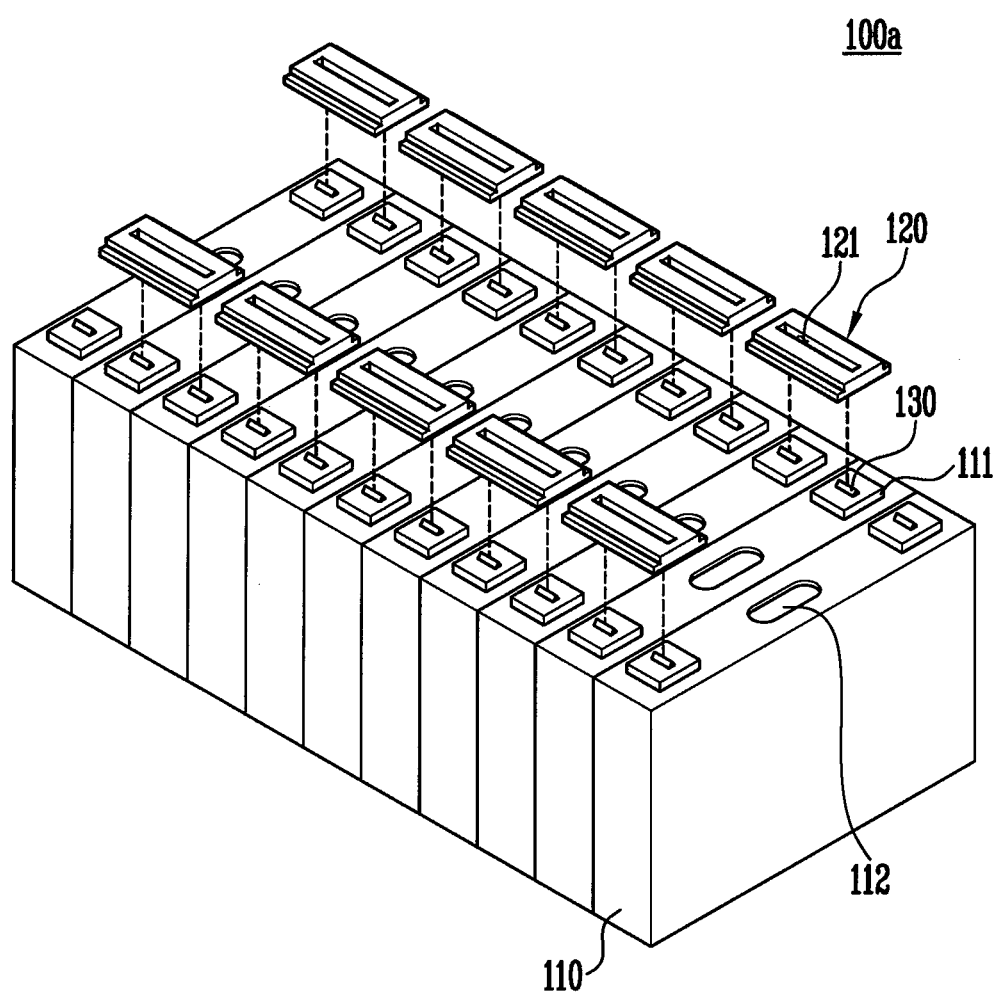
FIG. 2 is an exploded perspective view of the battery module shown in FIG. 1.

FIG. 1 is a perspective view of a battery module 100a according to an embodiment of the present invention. FIG. 2 is an exploded perspective view of the battery module 100a shown in FIG. 1. Hereinafter, the battery module 100a according to this embodiment will be described with reference to FIGS. 1 and 2.

As shown in FIGS. 1 and 2, the battery module 100a according to this embodiment may include a plurality of battery cells 110, a bus-bar 120 configured to electrically couple the battery cells 110, and a reflective portion 130 positioned at a terminal 111 of the battery cell 110.

Each battery cell 110 according to this embodiment generates (or releases) energy, and may include a plurality of battery cells 110. In this embodiment, each battery cell 110 may include a battery case having an opening, and an electrode assembly with an electrolyte, which may be accommodated in the battery case. In this embodiment, the electrode assembly and the electrolyte may generate (or release) energy through an electrochemical reaction. The battery case may be sealed at one surface of the battery cell 110 including a cap assembly. In addition, terminals 111 having different polarities, i.e., positive and negative electrode terminals, may protrude through the one surface of the battery cell 110. Each battery cell 110 may include a vent 112 configured to act as a passage through which gas generated inside the battery cell 110 may be exhausted to an exterior of the battery cell 110, as a safety mechanism for the battery cell 110 positioned on the one surface of the battery cell 110 with the terminals 111 and the cap assembly. In this embodiment, the plurality of battery cells 110 may be aligned in one direction. In embodiments where the battery cells 110 are connected in series, the battery cells 110 are aligned so that the polarities of the terminals 111 of adjacent battery cell 110 are different from each other. In embodiments where the battery cells 110 are connected in parallel, the battery cells 110 may be aligned such that the polarities of the terminals 111 of adjacent battery cell 110 are identical to each other.

The bus-bar 120 according to this embodiment electrically couples the plurality of battery cells 110 to one another. The bus-bar 120 may be welded to the terminals 111 of the battery cell 110. In an embodiment, the bus-bar 120 couples the terminals 111 of adjacent battery cells 110 of the plurality of battery cells 110, thereby implementing the serial or parallel electrical connection between the battery cells 110 based on the polarities of the terminals 111 of the adjacent battery cells 110. The bus-bar 120 may be welded to the terminals 111, according to an embodiment. In this embodiment, an opening 121 defined in the bus-bar 120 may be configured such that a laser used for welding can be incident between the bus-bar 120 and the terminal 111.

In other embodiments of the present invention, the battery module 100a may further include a housing and a plate configured for fixing or accommodating the plurality of battery cells 110.

Figure 3:
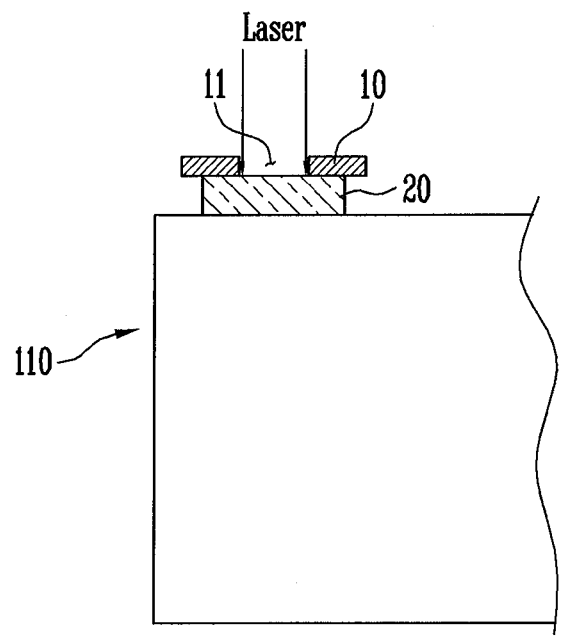
FIGS. 3 and 4 are cross-sectional views of battery modules of related art, shown for comparison with the embodiment of the battery module shown in FIG. 1.
Figure 4:
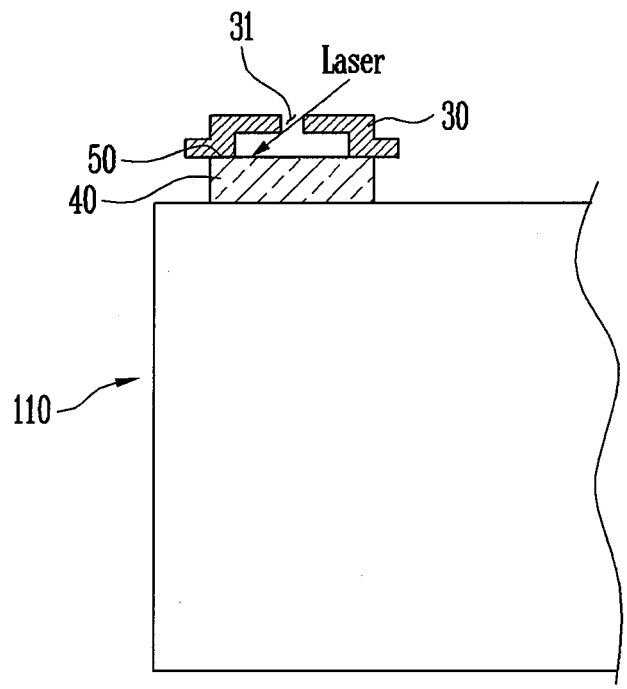
Figure 5:
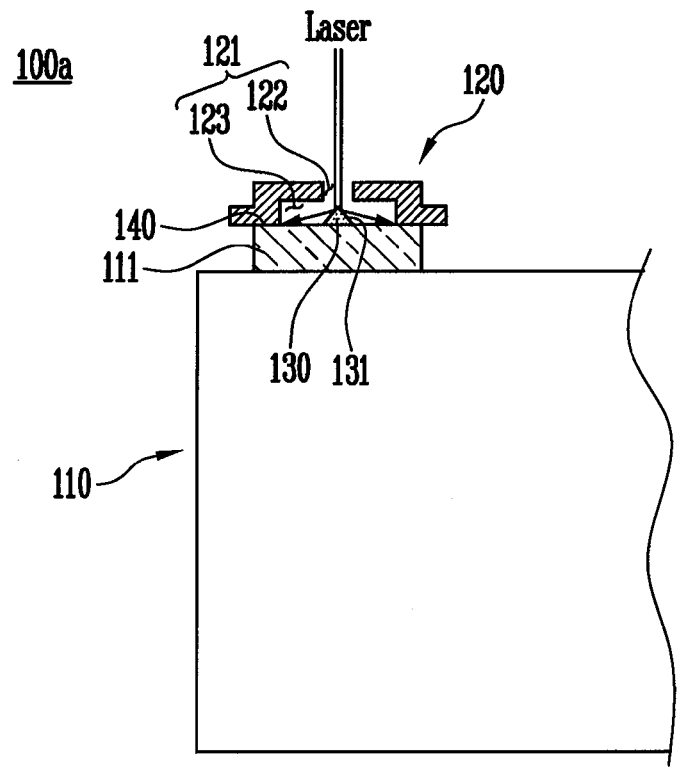
FIG. 5 is a cross-sectional view of the battery module taken along the line A-A' of the battery module shown in FIG. 1.
Figure 6:
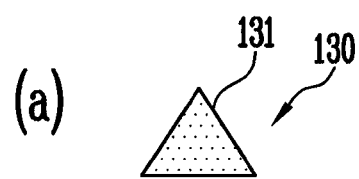
FIG. 6 is a cross-sectional view illustrating the various shapes of a reflective portion of the battery module shown in FIG. 5.
Figure 6:
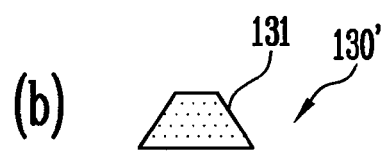
Figure 6:
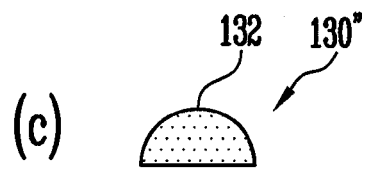

FIGS. 3 and 4 are cross-sectional views of battery modules of related art, shown for comparison with the embodiment of the battery module 100a shown in FIG. 1. FIG. 5 is a cross-sectional view of the battery module 100a taken along the line A-A' of the battery module 100a shown in FIG. 1. FIG. 6 is a cross-sectional view illustrating the various shapes of the reflective portion 130 of the battery module 100a shown in FIG. 5. Hereinafter, the reflective portion 130 of the battery module 100a according to this embodiment will be described with reference to FIGS. 3 to 6.

As described above, the opening 121 defined in the bus-bar 120 may be configured such that a laser used in welding the bus-bar 120 entering through the opening 121 can be reflected by the reflective portion 130 to be incident onto the bus-bar 120. In the related art shown in FIG. 3, laser is irradiated through an opening 11, to be guided between a bus-bar 10 and a terminal 20. However, in such a structure, a welding portion is directly exposed outside of the bus-bar 10. Hence, this may not be preferable in terms of safety.

A bus-bar 30 of related art with a structure as shown in FIG. 4 may be considered a solution to the problems with the related art shown in FIG. 3. However, in this example where an opening 31 of the bus-bar 30 has a stepped shape, as shown in the structure of FIG. 4, it may be difficult to directly guide a laser with accuracy between an inner wall of the opening 31 and a terminal 40, i.e., to a welding portion 50 angled away from the opening 31. Although the laser is diagonally irradiated in this example, the laser often reaches an area not meant to be welded, as shown in FIG. 4. Therefore, in this example, a portion of the bus-bar 30 outside the welding portion 50 may be damaged by the laser. This result may not be preferable in terms of electrical safety.

In the embodiments of the present invention, as shown in FIG. 5, each battery cell 111 includes a reflective portion 130 positioned on the terminal 111 such that a laser used for welding the bus-bar 120 is reflected on to a welding portion 140 of the bus-bar 120 through the reflection portion 130. Specifically, the reflective portion 130, according to this embodiment, has at least one inclined surface 131, and is configured to reflect the laser entering through the opening 121 and incident thereon onto the welding portion 140 of the bus-bar 120. In this embodiment, the reflective portion 130 is configured to guide at least a portion of the laser reflected by the reflective portion 130 between the bus-bar 120 and the terminal 111, i.e., to the welding portion 140.

In this embodiment, the opening 121 has a stepped shape. More specifically, the opening 121, according to this embodiment, may include a first opening 122 positioned at a distance from the terminal 111, and a second opening 123 coupled to the first opening 122 and relatively adjacent to the terminal 111, the second opening 123 being larger than the first opening 122. In this embodiment, the reflective portion 130 may be positioned inside the second opening 123. The reflective portion 130 according to this embodiment is configured to reflect the laser such that at least one portion of the laser can be transferred to the point at which an inner wall defined by the second opening 123 and the terminal 111 meet each other. Accordingly, the terminal 111 and the bus-bar 120 may be stably coupled, i.e., welded, to each other, while the welding portion 140 may avoid direct exposure to an exterior surface of the bus-bar 120, thereby improving electrical safety of the battery module 100a. In this embodiment, because the welding portion 140 is not directly exposed to the exterior and because the first opening 122 is smaller than the second opening 123, the welding portion 140 is exposed to relatively less exterior influences.

In an embodiment, the reflective portion 130 is positioned on the terminal 111 and may be positioned such that the reflective portion 130 is exposed through the opening 121. For example, in this embodiment, the reflective portion 130 may be positioned such that when viewed directly from above through the opening 121, the reflective portion 130 is visible such that the laser can be directly focused on the reflective portion 130. For example, in an embodiment, the reflective portion 130 may be positioned directly below the first opening 122 such that the laser can be irradiated onto the inclined surface 131 of the reflective portion 130. In an embodiment, a portion of the reflective portion 130 may be melted or experience a change in shape by the irradiation of the laser, and the melted portion may be interposed between the bus-bar 120 and the terminal 111 and become a portion of the welding portion 140. However, embodiments of the present invention are not limited thereto, and the reflective portion 130 may be made of a material which is not necessarily or fully melted by the laser, or which is more minimally or negligibly affected by the laser. In addition, it will be apparent that in embodiments where the welding portion 140 is melted, the shape of the reflective portion 130 may be changed from its original shape.

The reflective portion 130 may include various shapes, as shown in FIG. 6. Specifically, as shown in FIG. 6(a), the reflective portion 130 may have a cross-section in the shape of a triangle having at least one inclined surface 131. Alternatively, as shown in FIG. 6(b), the reflective portion 130' may have a cross-section in the shape of a trapezoid having at least one inclined surface 131. Alternatively, as shown in FIG. 6(c), the reflective portion 130" may have a cross-section in the shape of a semicircle having a curved surface 132. However, embodiments of the present invention are not limited thereto, and the shape of the reflective portion 130 may include all shapes from which the laser incident into the bus-bar 120 through the opening 121 can be reflected, as appreciated by those skilled in the art. The reflectivity of the reflective portion 130 according to an embodiment may be, for example, a reflectivity of at least 80% of the laser applied to the reflective portion 130 during welding of the bus-bar 120 to the terminal 111. The reflective portion 130, according to embodiments of the present invention, may be made of any reflective material suitable for a reflective portion 130 appreciated by those skilled in the art, including silver, aluminum, copper, or a mirror material, the mirror having a glass layer and a metal layer coated on the glass layer.

Figure 7:
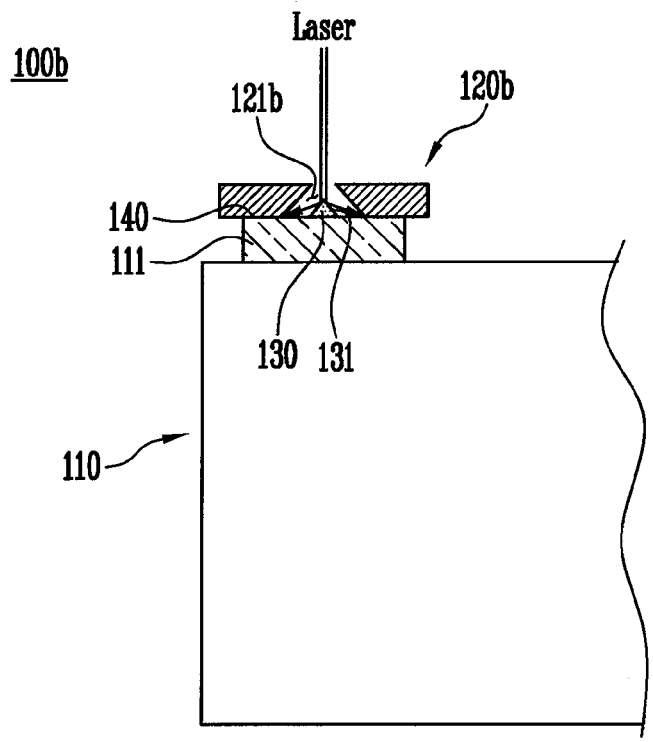
FIG. 7 is a cross-sectional view of a battery module according to another embodiment of the present invention.

FIG. 7 is a cross-sectional view of a battery module 100b according to another embodiment of the present invention. Hereinafter, the battery module 100b according to this embodiment will be described with reference to FIG. 7.

In battery modules where the welding portion is directly exposed to an exterior of the bus-bar as described above with regards to related art shown in FIGS. 3 and 4, the electrical safety of the battery module may be compromised. To overcome such safety concerns, a bus-bar 120b shown in the embodiment of FIG. 7 as well as the bus-bar 120 shown in the embodiment of FIG. 5, may be considered. In the bus-bar 120b shown in the embodiment of FIG. 7, an opening 121b defined in the bus-bar 120b may have a shape in which a size of the opening 121b in the bus-bar 120b decreases in a direction away from the terminal 111 (e.g., gradually decreases in size as the opening moves away from the terminal 111), such that the opening 121b is smaller at the surface of the bus-bar 120b adjacent to the exterior, and largest at a position in contact with the terminal 111 or welding portion 140. In an embodiment, for example, the opening 121b has a triangular or conical cross-section with a wider opening closer to the terminal 111. Accordingly, the welding portion 140, in these embodiments, is not directly exposed to an exterior of the battery cell 110, thereby improving its electrical safety. In an embodiment where a laser is irradiated to weld the bus-bar 120b and the terminal 111, the irradiated laser may be reflected by the reflective portion 130 such that at least one portion of the laser can be guided between the bus-bar 120 and the terminal 111. Thus, according to these embodiments, it may be possible to conveniently perform the process of welding the bus-bar 120b and the terminal 111 while maintaining or improving the electrical safety of the battery cell 110.

Figure 8:
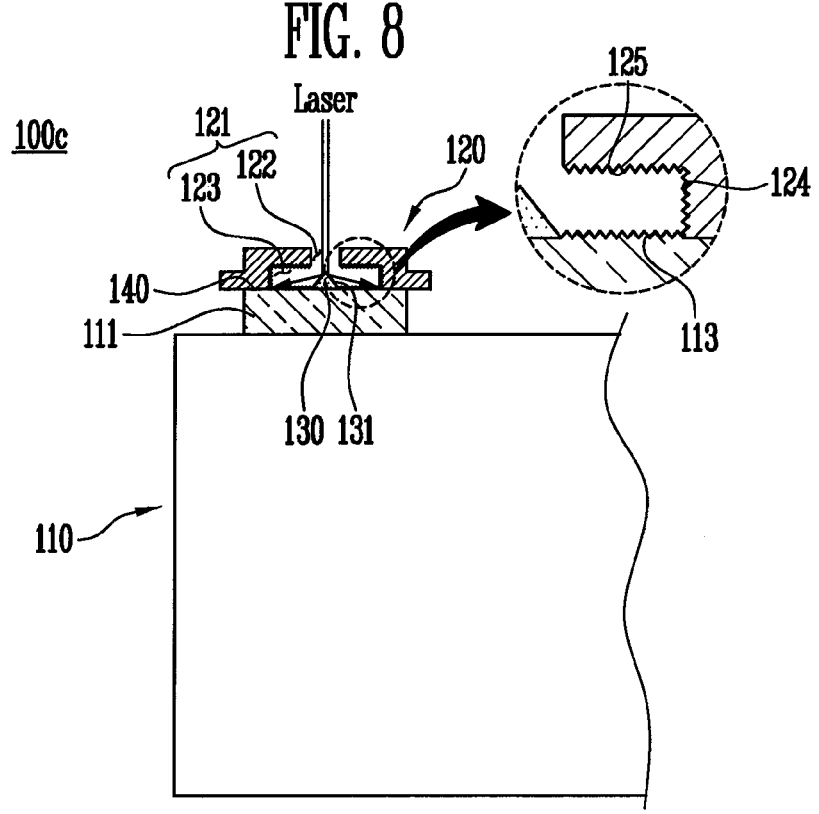
FIG. 8 is a cross-sectional view of a battery module according to another embodiment of the present invention.

FIG. 8 is a cross-sectional view of a battery module 100c according to another embodiment of the present invention. Hereinafter, the battery module 100c according to the present invention will be described with reference to FIG. 8. Here, components identical to those of the aforementioned embodiment are designated by like reference numerals, and their detailed descriptions are omitted to avoid redundancy.

As shown in FIG. 8, the battery module 100c according to this embodiment includes the battery cell 110, the bus-bar 120, and the reflective portion 130. In this embodiment, textured surfaces 113 and 124 may be formed on at least one of an inner wall of the bus-bar 120 and a top surface of the terminal 111.

In these embodiments including the reflective portion 130 as described above, a portion of a laser used to weld the bus-bar 120 to the terminal 111 may be guided to a point to be welded. However, in some cases, the laser may not be sufficiently guided to the point to be welded. For example, the laser guidance may not be initially sufficient due to an error of the angle of the inclined surface 131 or the irradiation angle of the laser, or the laser may be guided to a point to be welded that is insufficient due to a change in the angle of the inclined surface 131 while the reflective portion 130 is melted by the laser. In these embodiments, if diffused reflection is produced around the point to be welded, the amount of the laser guided to the point to be welded can be increased. In order to attain the desired result of diffusing reflection of the laser angle, formation of the textured surfaces 113 and 124 on the inner wall of the opening 121 of the bus-bar 120 and/or the top surface of the terminal, according to embodiments of the present invention, may produce the desired diffused reflection necessary to further guide or redirect the laser to the welding portion 140.

Specifically, in an embodiment, the textured surface 124 may be formed on the inner wall of the second opening 123 of the bus-bar 120 and a stepped surface 125 of the second opening 123, and/or the textured surface 113 may be formed on the top surface of the terminal 111 (except where the reflective portion 130 is positioned).

Accordingly, although the laser reflected by the reflective portion 130 may not be exactly guided to the point to be welded, according to some embodiments, the laser can be gradually guided or fine-tuned to the desired welding portion 140 by diffusing the reflected laser in an inner space of the second opening 123. Thus, it may be possible to conveniently perform the process of welding between the bus-bar 120 and the terminal 111, according to these embodiments. Further, the welding portion 140 according to these embodiments can be securely formed or coupled, thereby improving the electrical safety of the connection of the bus-bar 120 to the terminal 111.

Figure 9:
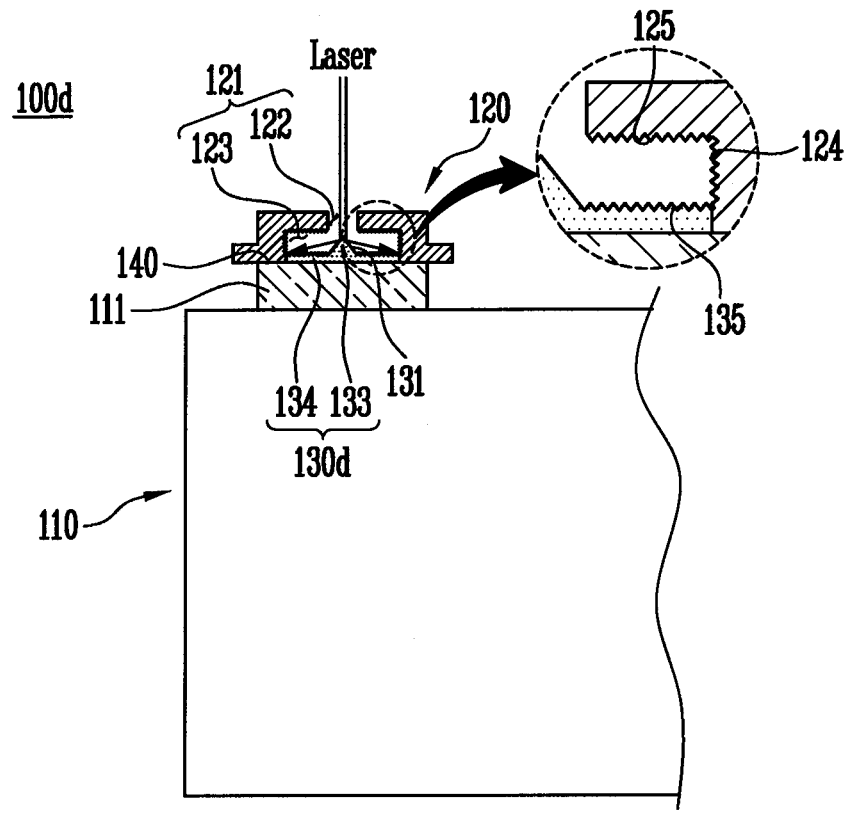
FIG. 9 is a cross-sectional view of a battery module according to another embodiment of the present invention.

FIG. 9 is a cross-sectional view of a battery module 100d according to another embodiment of the present invention. Hereinafter, the battery module 100d according to the present invention will be described with reference to FIG. 9. Here, components identical to those of the aforementioned embodiment are designated by like reference numerals, and their detailed descriptions are omitted to avoid redundancy.

As shown in FIG. 9, the battery module 100d according to this embodiment includes the battery cell 110, the bus-bar 120, and a reflective portion 130d. In this embodiment, at least one outer surface of the reflective portion 130d may contact an inner wall of the second opening 123. Specifically, the reflective portion 130d may include a first reflective portion 133 and a second reflective portion 134. In this embodiment, the first reflective portion 133 includes at least one inclined surface 131, and reflects, on the inclined surface 131, laser incident onto the bus-bar 120 through the opening 121, to be guided between the bus-bar 120 and the terminal 111. The second reflective portion 134, according to this embodiment, maybe positioned between the first reflective portion 133 and the terminal 111 such that an outer surface of the second reflective portion 134 contacts the inner wall of the second opening 123.

Accordingly, the bus-bar 120, according to this embodiment, may be coupled to the terminal 111 such that an outer surface of the second reflective portion 134 contacts the inner wall of the second opening 123, thereby facilitating the aligning process of the bus-bar 120. In addition, a portion of the second reflective portion 134 substantially exposed to a space between the bus-bar 120 and the terminal 111, i.e., the point to be welded, may be melted by the laser and then interposed between the bus-bar 120 and the terminal 111, according to an embodiment of the present invention, to become a part of the welding portion 140. Thus, according to this embodiment, the welding portion 140 can be more stably connected, thereby further improving the electrical safety at the connection of the bus-bar 120 to the terminal 111.

Moreover, as described in the previous embodiments, the textured surface 124 may be formed on the inner wall of the second opening 123 and the stepped surface 125 of the second opening 123 in order to produce a desired diffused reflection of the laser, and a textured surface 135 may be formed on a top surface of the second reflective portion 134 in order to maximize or improve this diffused reflection. In this embodiment, the textured surface 135 may be formed on the top surface of the second reflective portion 134, except for the portion connected to the first reflective portion 133.

Figure 10:
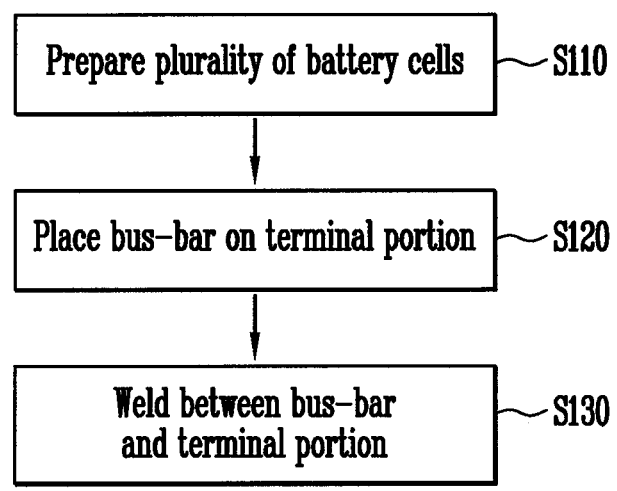
FIG. 10 is a flowchart illustrating a method of manufacturing a battery module according to an embodiment of the present invention.

FIG. 10 is a flowchart illustrating a method of manufacturing a battery module according to an embodiment of the present invention. Hereinafter, the method according to this embodiment will be described with reference to FIG. 10.

In order to manufacture the battery module 100a according to this embodiment, a plurality of battery cells 110 may be first prepared (S110). In this embodiment, the battery cells 110 may be prepared by aligning the battery cells 110 and placing a reflective portion 130 on a top surface of a terminal 111 of each battery cell 110.

Next, a bus-bar 120 for electrically coupling the plurality of battery cells 110 may be positioned on the terminal 111 (S120). In this embodiment, the bus-bar 120 may connect the terminals 111 of adjacent battery cells 110 in a serial or parallel connection.

Next, the bus-bar 120 and the respective terminals 111 may be coupled to each other, for example, welded to each other (S130). In this embodiment, welding the bus-bar 120 and the terminals 111 may include irradiating a laser through an opening 121 of the bus-bar 120. The laser, according to this embodiment, may be reflected by the reflective portion 130 such that at least a portion of the laser is guided to a point at which the bus-bar 120 and the terminal 111 contact each other, allowing the bus-bar 120 to be welded to the terminal 111.

The battery module, according to embodiments of the present invention, can be manufactured by the method described above, and it will be understood by those skilled in the art that the battery module may be modified in many ways without departing from the spirit and scope of the invention, for example, by adding the textured surface, changing the shape of the reflective portion, etc.

Example embodiments have been disclosed herein, and although specific terms are employed, they are used and are to be interpreted in a generic and descriptive sense only and not for purposes of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery module comprising:
   a plurality of battery cells each comprising a terminal;
   a bus-bar coupled to the terminal to electrically connect the plurality of battery cells, the bus-bar having an opening, a size of the opening decreasing in a direction away from the terminal; and
   a reflective portion on the terminal and between the terminal and a smallest portion of the opening of the bus-bar, the opening of the bus-bar exposing at least a portion of the reflective portion.

2. The battery module of claim 1, wherein the reflective portion is configured to reflect laser incident thereon through the opening.

3. The battery module of claim 2, wherein the reflective portion is configured to guide at least a portion of the laser reflected by the reflective portion between the bus-bar and the terminal.

4. The battery module of claim 2, wherein at least a portion of the reflective portion is melted by the laser reflected between the bus-bar and the terminal.

5. The battery module of claim 1, wherein the opening of the bus-bar has a stepped shape.

6. The battery module of claim 5, wherein the opening of the bus-bar comprises a first opening and a second opening nearer to the terminal than the first opening, the second opening being configured to communicate with the first opening and being larger than the first opening.

7. The battery module of claim 6, wherein the reflective portion is positioned in the second opening.

8. The battery module of claim 6, wherein the reflective portion contacts a portion of the bus-bar adjacent the second opening.

9. The battery module of claim 8, wherein the reflective portion comprises a first reflective portion comprising at least one inclined surface configured to reflect a laser incident thereon through the first opening and to guide the laser between the bus-bar and the terminal, and a second reflective portion between the first reflective portion and the terminal, wherein the second reflective portion contacts the portion of the bus-bar adjacent the second opening.

10. The battery module of claim 9, wherein an exposed surface of the second reflective portion comprises a textured surface.

11. The battery module of claim 1, wherein the reflective portion comprises at least one inclined surface.

12. The battery module of claim 11, wherein the at least one inclined surface of the reflective portion is configured to reflect a laser incident thereon through the opening to couple the bus-bar and the terminal to each other.

13. The battery module of claim 1, wherein an inner wall of the bus-bar comprises a textured surface.

14. The battery module of claim 1, wherein an exposed surface of the terminal comprises a textured surface.

15. The battery module of claim 1, wherein at least a portion of the reflective portion has a triangular, trapezoidal, or curved-surface shape.

16. The battery module of claim 1, wherein the reflective portion has a reflectivity of at least 80 percent of a laser applied to the reflective portion.

17. The battery module of claim 1, wherein the reflective portion comprises at least one selected from the group consisting of silver, aluminum, copper, and a mirror, wherein the mirror comprises a glass layer and a metal layer coated on the glass layer.

* * * * *